(12) United States Patent
Gatti et al.

(10) Patent No.: US 9,964,248 B2
(45) Date of Patent: May 8, 2018

(54) FLUID TRANSMISSION FLAT-FACE COUPLER WITH FRONTAL ANNULAR SEAL

(71) Applicant: STUCCHI S.p.A., Brignano Ger D'Adda (BG) (IT)

(72) Inventors: Gianmarco Gatti, Pognano (IT); Giovanni Stucchi, Treviglio (IT); Sergio Tivelli, Cividate al Piano (IT)

(73) Assignee: STUCCHI S.P.A., Brignano Gera D'Adda (BG) (IT)

(*) Notice: Subject to any disclaimer, the term of this patent is extended or adjusted under 35 U.S.C. 154(b) by 0 days. days.

(21) Appl. No.: 15/035,310

(22) PCT Filed: Nov. 10, 2014

(86) PCT No.: PCT/EP2014/074120
§ 371 (c)(1),
(2) Date: May 9, 2016

(87) PCT Pub. No.: WO2015/067794
PCT Pub. Date: May 14, 2015

(65) Prior Publication Data
US 2016/0290543 A1    Oct. 6, 2016

(30) Foreign Application Priority Data
Nov. 11, 2013 (IT) .............................. MI2013A1866

(51) Int. Cl.
*F16L 37/32* (2006.01)
*F16L 37/23* (2006.01)
(Continued)

(52) U.S. Cl.
CPC ............... *F16L 37/32* (2013.01); *F16L 37/23* (2013.01); *F16L 37/413* (2013.01); *F16L 37/56* (2013.01); *F16L 2201/80* (2013.01)

(58) Field of Classification Search
CPC . F16L 37/32; F16L 37/56; F16L 37/23; F16L 37/413; F16L 2201/80; F16L 37/36;
(Continued)

(56) References Cited

U.S. PATENT DOCUMENTS 3,881,514 A * 5/1975 Berg ..................... E02F 3/3654
137/614.04
4,540,021 A    9/1985 Rogers
(Continued)

FOREIGN PATENT DOCUMENTS

DE    102 30 293    6/2004
EP    0 122 404    10/1984
EP    2 407 701    8/2012

OTHER PUBLICATIONS

International Search Report dated Feb. 19, 2015 in International Application No. PCT/EP2014/074120.
(Continued)

*Primary Examiner* — Michael R Reid
(74) *Attorney, Agent, or Firm* — Wenderoth, Lind & Ponack, L.L.P.

(57) ABSTRACT

A fluid transmission fitting (100) is described comprising a flat-faced female coupler (47) with a frontal annular seal (400) to protect from the introduction of impurities, when uncoupled, during the step of coupling-uncoupling and when coupled to a flat-faced male coupler (48).

4 Claims, 22 Drawing Sheets

(51) Int. Cl.
*F16L 37/413* (2006.01)
*F16L 37/56* (2006.01)

(58) Field of Classification Search
CPC ..... Y10T 137/87925; Y10T 137/87933; Y10T 137/87965; Y10T 137/87973; Y10T 137/88038; Y10T 137/88046
USPC .... 137/614, 614.01, 615.05, 614.06, 614.18, 137/614.19; 251/149.9, 149.1
See application file for complete search history.

(56) References Cited

U.S. PATENT DOCUMENTS

| | | |
|---|---|---|
| 2004/0079423 A1 | 4/2004 | Mikiya et al. |
| 2006/0273580 A1 | 12/2006 | Marquis |
| 2012/0013120 A1 | 1/2012 | Rusconi et al. |

OTHER PUBLICATIONS

Written Opinion of the International Preliminary Examining Authority dated Oct. 22, 2015 in International Application No. PCT/EP2014/074120.
International Preliminary Report on Patentability dated Feb. 9, 2016 in International Application No. PCT/EP2014/074120.

* cited by examiner

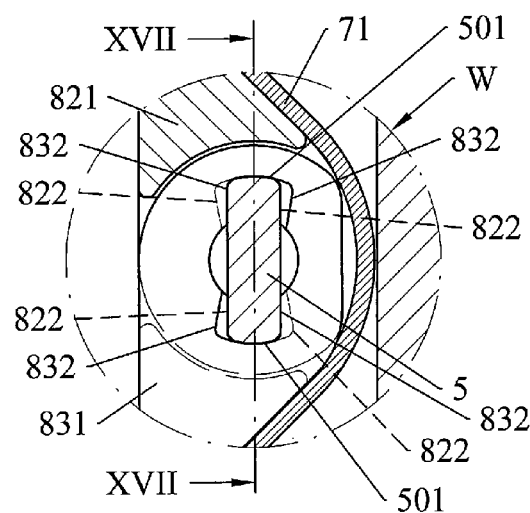
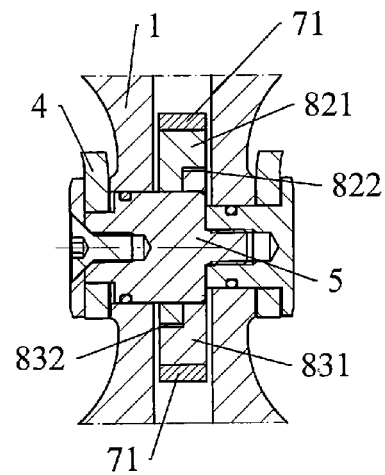
FIG.16　　FIG.17
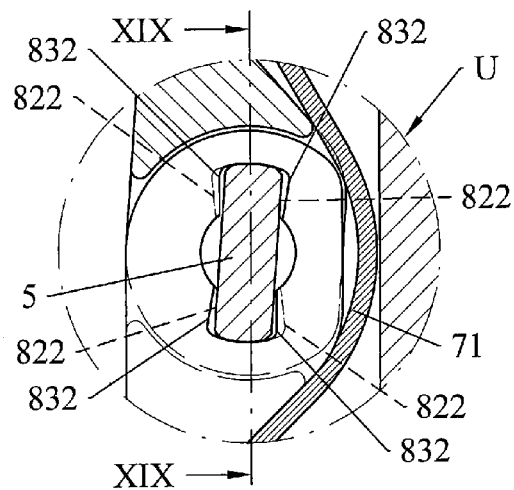
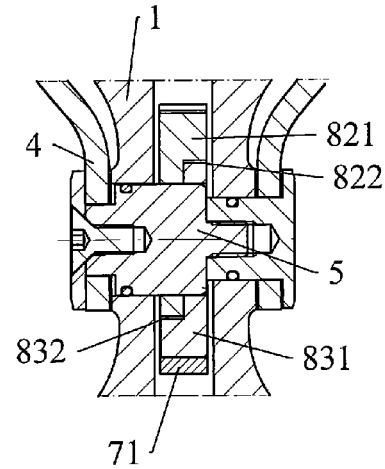
FIG.18　　FIG.19

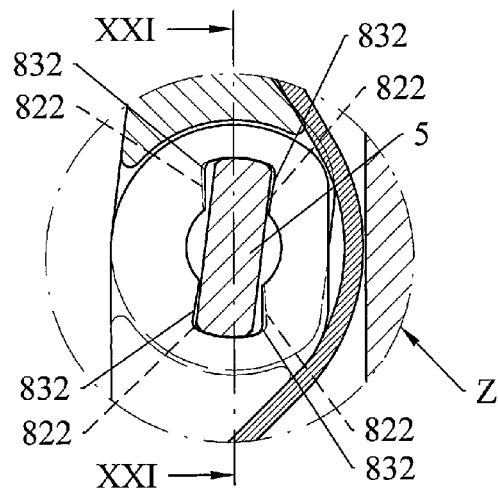
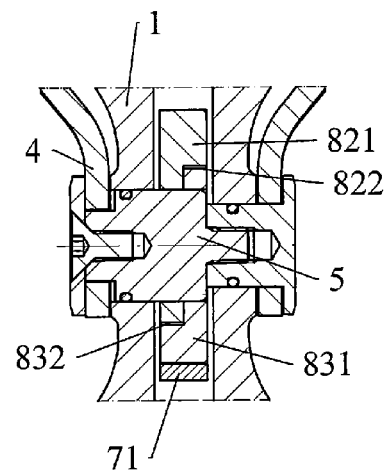
FIG.20        FIG.21
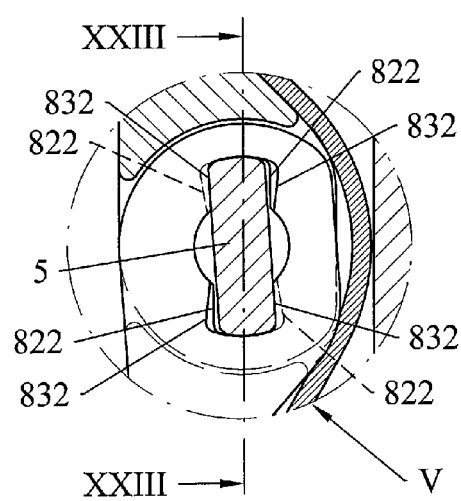
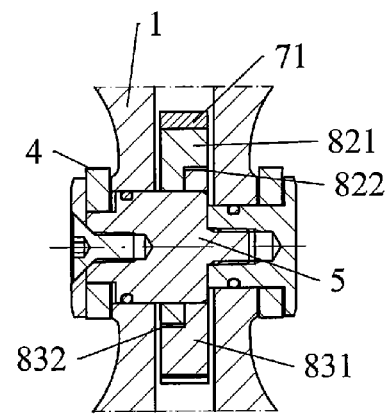
FIG.22        FIG.23

FLUID TRANSMISSION FLAT-FACE COUPLER WITH FRONTAL ANNULAR SEAL

BACKGROUND OF THE INVENTION

1. Technical Field

The present invention relates to a fluid transmission flat-face coupler with frontal annular seal.

Fittings which may be rapidly coupled to one another to connect a fluid feed, by means of rigid pipes or flexible hoses, are frequently required for fluid transmission for example in operating machines and hydraulic equipment

2. Description of the Related Art

The known quick coupling fittings usually consist of two couplings, named male and female, which are fastened to respective pipes to be joined and which can be coupled together by screwing or by snapping.

The aforesaid male and female couplers are formed by fixed parts and axially sliding parts, which at rest are arranged in a closing position of a fluid passage gap and during the coupling between two members are displaced by engaging with corresponding parts of the other member to an opening position of said passage gap.

The currently marketed fluid transmission solutions show that the coupling between the male coupler and the female coupler is not always very easy with effort increasing incrementally as the residual pressure present in the circuit increases.

Italian patent application MI2012A001254 by the present Applicant concerns a fluid transmission coupling connectable with constant effort provided with a pressure compensation and relief system which is complex and not very cost-effective. Said known fitting further comprises a central locking system which is mechanically cumbersome and ineffective in some situations of accidental actuating by the user.

U.S. Pat. No. 4,540,021 describes a fluid transmission fitting with a female coupler, which includes a frontal seal, which prevents the introduction of impurities only when coupled to a male coupler and during the step of coupling or uncoupling of the male coupler. A closing plug is provided to prevent the introduction of impurities into the uncoupled female coupler.

U.S. Pat. No. 3,407,847 describes a fluid transmission fitting with a female coupler, which includes a frontal seal, which prevents the introduction of impurities only when coupled to a male coupler and during the step of coupling or uncoupling of the male coupler. Said frontal seal does not cover the wide frontal opening of the female coupler when the female coupler is uncoupled, the impurities thus being disadvantageously able to enter.

It is the object of the present invention to make a pipe fitting, in which the effort required for the coupling operation is minimum and independent from the residual pressure present in the circuit.

It is a further object of the present invention to make the fitting mechanically simpler and allow a suitable hydraulic control to guarantee user safety also in the event of accidental actuation.

It is a yet further object to prevent the introduction of impurities into the female coupler both if it is uncoupled from the male coupler and if it is coupled to the male coupler and during the step of coupling or uncoupling with or from the male coupler.

According to the present invention, such objects are reached by means of a fluid transmission flat face fitting as described in claim 1.

BRIEF DESCRIPTION OF THE DRAWINGS

The features of the present invention will be more apparent from the following detailed description of a non-limitative example thereof shown in the accompanying drawings, in which:

FIG. 16 shows an enlarged detail in a circle W of the cam in resting position in FIG. 1;

FIG. 17 shows a section view taken along line XVII-XVII in FIG. 16;

FIG. 18 shows an enlarged detail in a circle U of the cam in a first position rotated as shown in FIG. 2;

FIG. 19 shows a section view taken along line XIX-XIX in FIG. 18;

FIG. 20 shows an enlarged detail in a circle Z of the cam in a second rotated position in FIG. 13;

FIG. 21 shows a section view taken along line XXI-XXI in FIG. 20;

FIG. 22 shows an enlarged detail in a circle V of the cam in a third position rotated in opposite sense as shown in FIG. 27;

FIG. 23 shows a section view taken along line XXIII-XXIII in FIG. 22;

DETAILED DESCRIPTION OF THE INVENTION

Figure 1:
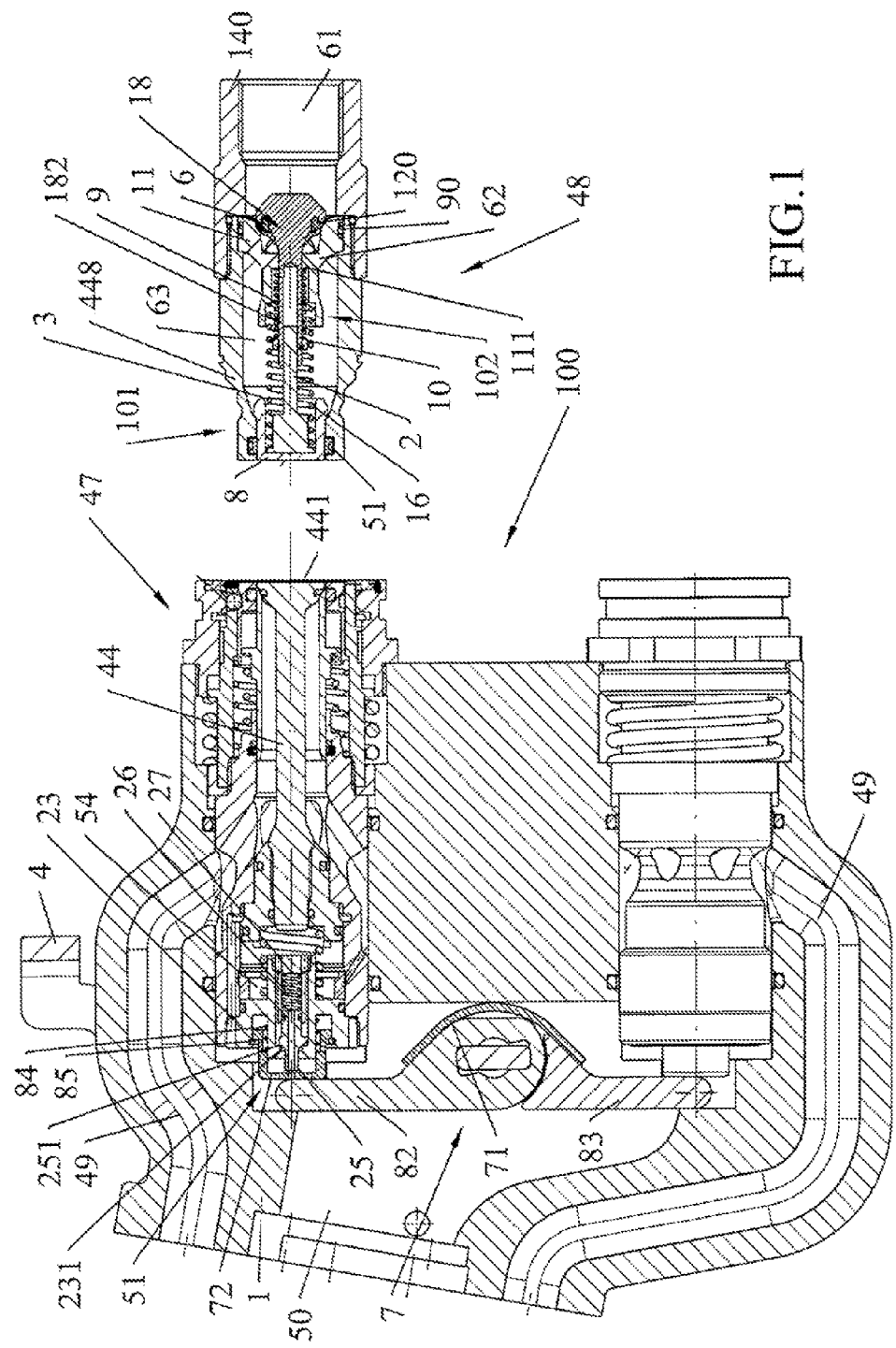
FIG. 1 shows a section view taken along line I-I in FIG. 26 of a fluid transmission fitting with uncoupled male and female coupler with a frontal seal according to a first embodiment.

FIG. 1 shows a coupling fitting 100 comprising a flat-faced female coupler 47 inserted in a hydraulic feeding block 1 and a flat-faced male coupler 48 which can be coupled to said female coupler 47.

The block 1, which feeds the fluid, comprises at least one hydraulic line 49 and a draining line 50, both interfacing with one or more female couplers 47.

In the description of the operation, reference will be made to only one male-female line (the one shown on the top in the drawings), but the considerations are applicable to all lines of a same fitting. It is worth noting that in the drawings the male-female coupler in the lower line is not shown in section but only as a view, the section being identical to that of the upper line.

The block 1 further comprises a lever 4 integral with a cam 7 adapted to relieve the pressure from a chamber 54 inside the female coupler 47, and adapted to uncouple the male coupler 48 from the female coupler 47.

The cam 7 consists of two parts, an upper one 82, which acts on the coupling of the upper hydraulic line, and a lower one 83, which acts on the coupling of the lower hydraulic line (FIG. 1).

The cams 82, 83 each have a disc-shaped attachment portion 821, 831 (FIGS. 16-23, in which the lower cam 83 is not shown in section for better comprehension of the operation described below) assembled on a central shaft 5 with a substantially rectangular section and rounded short sides 501 (FIG. 16) so as to allow the rotation of said shaft 5 in loops 822, 832 of said attachment portions 821, 831. The rotation of the central shaft 5 is transmitted by applying stress to the lever 4, which moves the attachment portion 821 of the upper cam 82 clockwise, but being free in the second loop 832 it does not move the attachment portion 831 of the lower cam 83, and moves the attachment portion 831 of the lower cam 83 anticlockwise but by being free in the loop 822 it does not move the attachment portion 821 of the upper cam 82.

The shape of said loops 822, 832 is substantially complementary to the shape of the central shaft 5, but their width is greater to allow a rotation clearance such to be able to move one cam 82 while maintaining the other 83 stationary, as will be more apparent below.

The cams 82, 83 are held in position by means of a spring 71, for example a C spring, but two compression springs may be provided. The central shaft 5 is integral with the lever 4, in turn.

The female coupler 47 comprises a pressure relief valve 51 which puts said chamber 54 into communication with the draining line 50 (FIG. 1).

Said valve 51 comprises a valve body 23, which forms a housing for a sliding shutter 25, stressed by a spring 26, which reacts against a protrusion of the shutter 25 and a stop 27. Sealing is ensured by the contact between a conical surface 251 of the shutter 25 and an edge 231 of the valve body 23 (FIG. 1).

A cup 72 sliding in axial direction and pushed by said upper cam 82 against the opposite thrust of a spring 84 acts on said shutter 25. The upper cam 82 is always in contact with the cup 72, which is pushed by the spring 84 against the cam 82 in releasing position of the shutter 25. Said cup 72 is thus moveable between an engaging position and a releasing position with the shutter 25.

The shutter 25 has therein a hole 252 (FIG. 2) for venting the air and a hydraulic thrust section reduced to the minimum. Such a hydraulic thrust section is determined by the interface diameter between the conical surface 251 of the shutter 25 and the valve body 23, and by the diameter of slightly smaller size of a rear part 263 of the shutter 25 on which a seal 28 acts. The described configuration of the shutter 25—valve body 23 coupling allows to minimize the actuation force of the shutter 25 itself in presence of residual pressure present inside the chamber 54.

The female coupler 47 further comprises an inner assembly 60 axially sliding inside an outer assembly 53 of the female coupler 47 itself, and a seal 19 adapted to generate a pressure difference between the hydraulic line 49 and the chamber 54.

Figure 2:
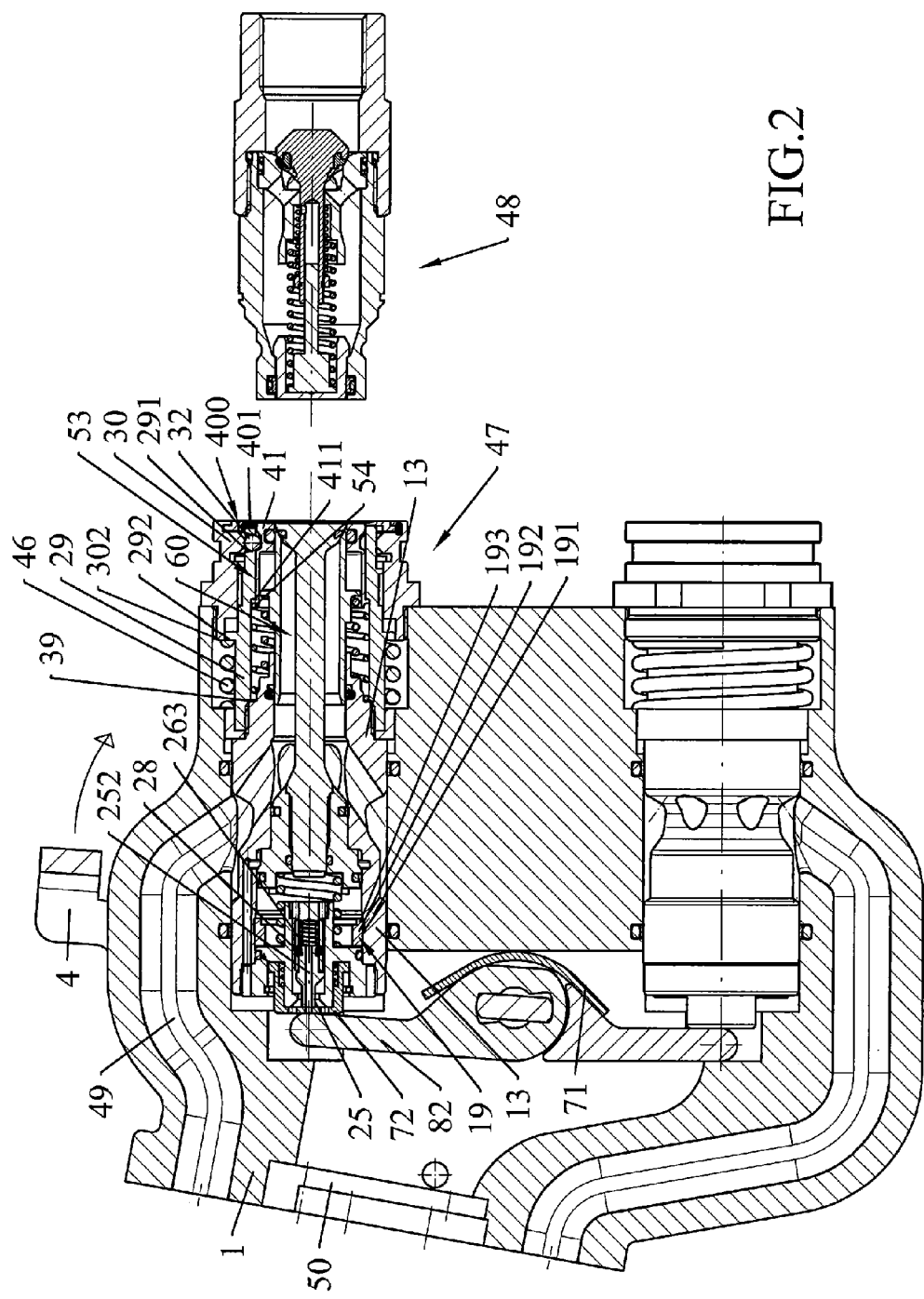
FIG. 2 shows a section view similar to the one in FIG. 1 of the fluid transmission fitting with male coupler and female coupler uncoupled in a step of relieving the residual pressure.

Said seal 19 is adapted to close a calibrated communication pipe 191 between the chamber 54 and the hydraulic line 49 contained in an inner body 13 (FIG. 2).

Said seal 19 is ring-shaped, determines a radial type sealing, i.e. orthogonal to the axis of the fitting 100, and comprises a non-deformable portion 192 and a deformable portion 193.

Said pipe 191 is external to the chamber 54 and the pressurized fluid flow inside it insists radially outwards from the inside of the chamber 54 at the outer surface of the seal 19.

When a given nominal pressure is reached, the deformable portion 193 bends towards the inside of the chamber 54 thus determining the introduction of pressurized fluid into the chamber 54 of the hydraulic line 49. When the pressure returns under said nominal pressure, the deformable portion 193 returns to its initial position thus obstructing the passage of fluid.

Said seal 19 can be used with identical operating principle also in case of non-flat-faced male-female couplers.

The female coupler 47 has flat faces in resting position (FIG. 1).

Figure 3:
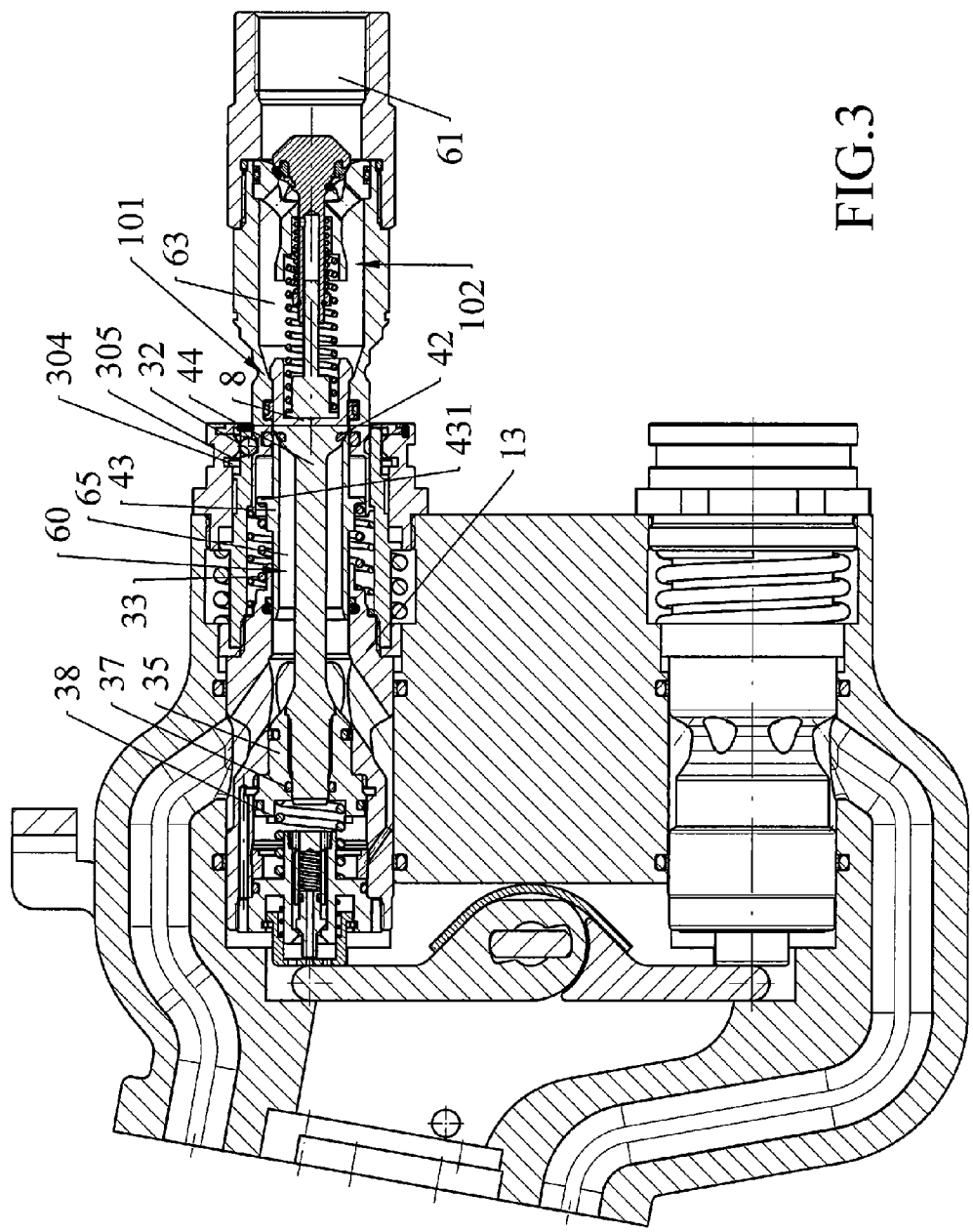
FIG. 3 shows a section view similar to the one in FIG. 1 of the fitting in a first step of coupling between male coupler and female coupler, with contact between the male coupler and the female coupler.

The inner assembly 60 comprises a bottom 35 and a stem 44 with a flat face 441 facing towards the outside of the female coupler 47, integral with each other, and a sealing bush 43 which define a gap 65 (FIG. 3). The sealing of the gap 65 is ensured by a seal 42 housed in a seat at the end of the stem 44 which is in contact with the sealing bush 43 pushed by the spring 33 which reacts between inner body 13 and an appropriate protrusion 431 of the sealing bush 43 itself (FIG. 3).

The outer assembly 53 (FIG. 2) comprises a ring nut holder 29, a ring nut 30 and at least one locking ball 32 arranged inside a housing 291 of the ring nut holder 29.

Figure 7:
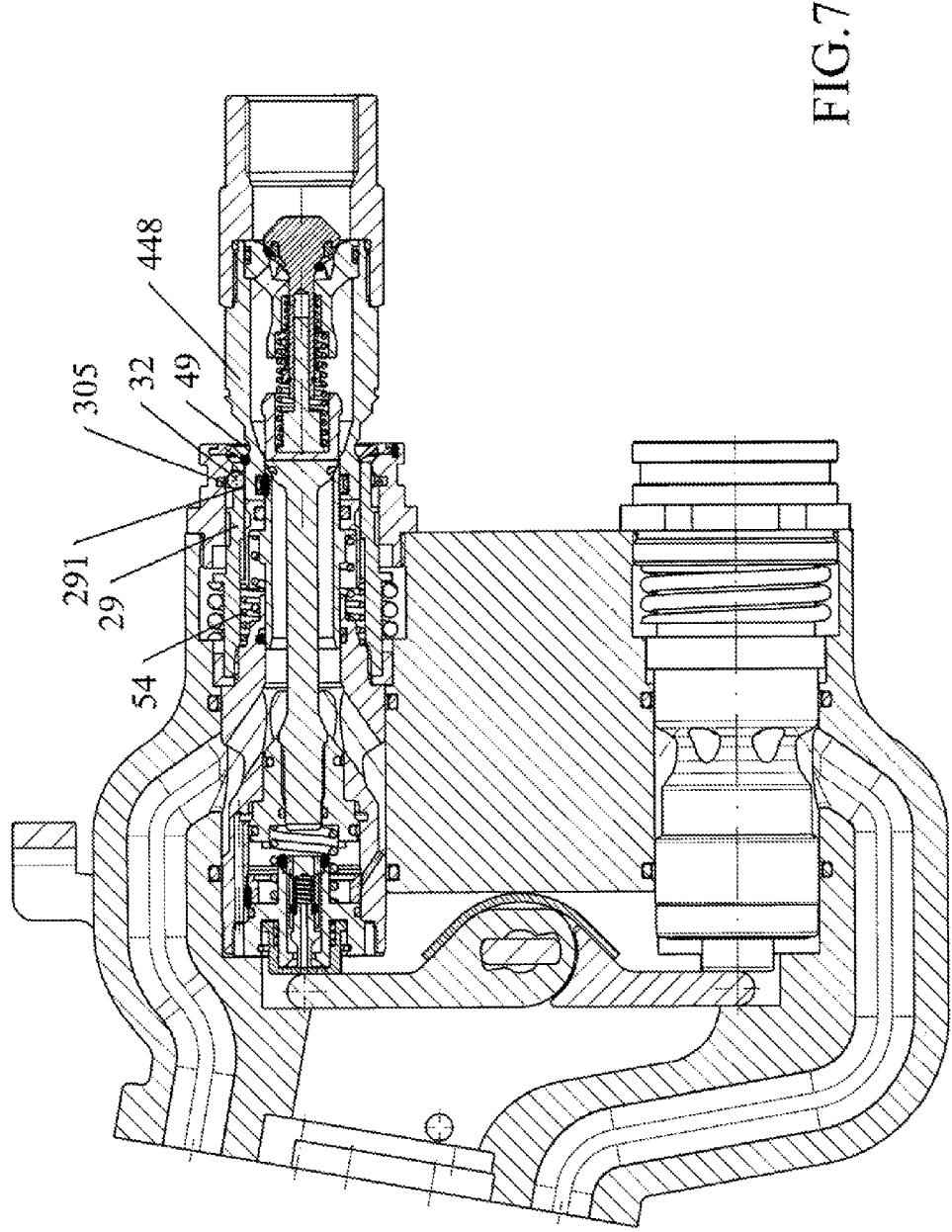
FIG. 7 shows a section view similar to the one in FIG. 1 of the fitting in a second step of coupling between male coupler and female coupler, with radial displacement of the balls in the female coupler in the fixing ring nut housing and consequent insertion of the male coupler.

The housing 304 (FIG. 3) comprises a deformable elastic member 305 for pushing the balls 32, as will be more apparent below (FIG. 7).

A spring 46 (FIG. 2), by reacting against appropriate protrusions 292, 302, against the ring nut 30, the ring nut holder 29 and the block 1, constrains the outer assembly 53 in a central resting position which guarantees the locking of the male coupler 48 after the coupling.

Equally, a cup 41 (FIG. 2) axially slides in the ring nut holder 29. A spring 54 reacts against a protrusion 411 of the cup 41 and stop shoulder 39 arranged in the inner body 13, also opposing in the case the sliding of the cup 41 in the ring nut holder 29 in coupling position.

Figure 6:
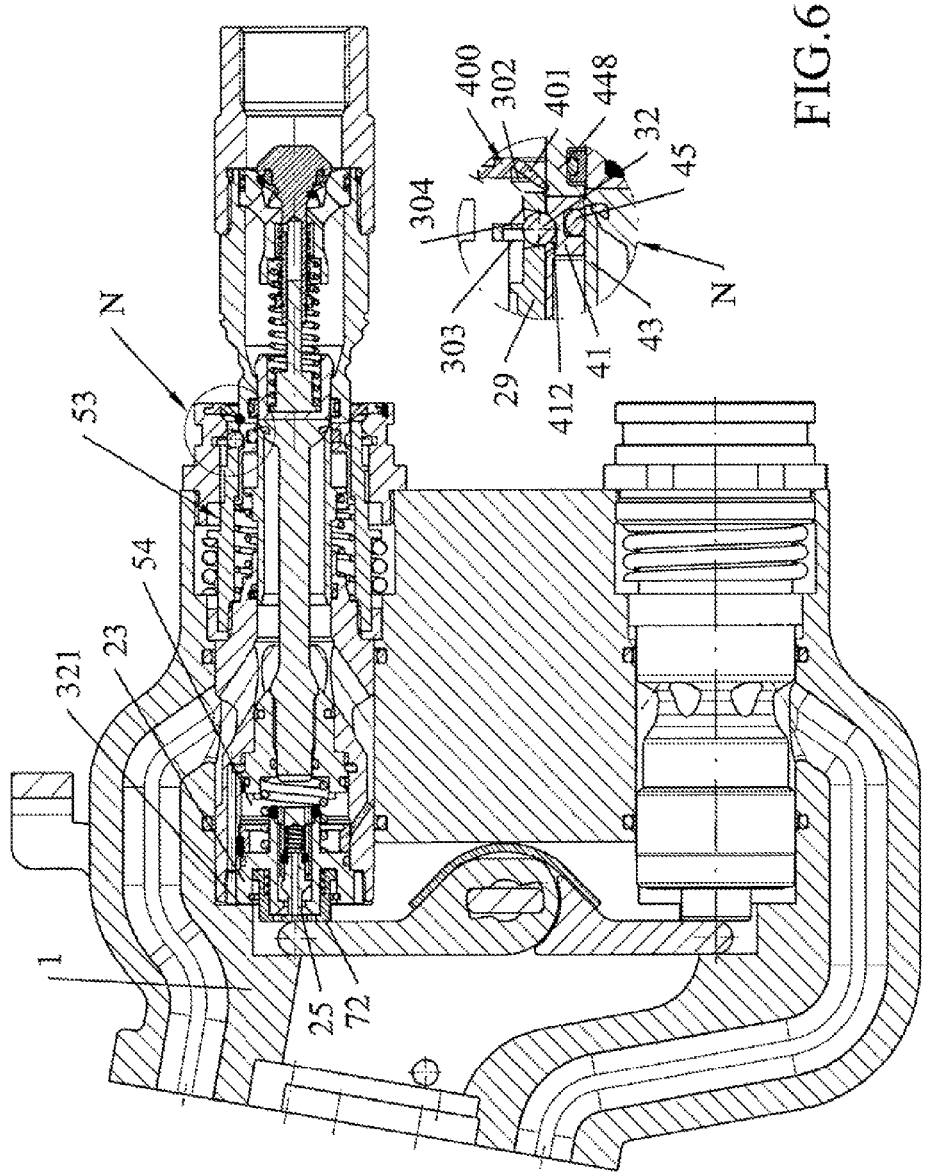
FIG. 6 shows a section view similar to the one in FIG. 1 of the fitting in a fourth step of coupling between male coupler and female coupler, with displacement of the inner part of the female coupler in the block with a detail enlarged in circle N and opening of the rear pressure relief.

The cup 41 further displays a housing 412 adapted to house the balls 32 when the female coupler 47 is uncoupled and a seal 45 which preloads on the diameter of the sealing bush 43 thus limiting the introduction of impurities between the two components (FIG. 6).

Near the cup 41 (FIG. 2), facing the male coupler 48, there is a frontal annular seal 400 with a deformable portion 401 which limits the introduction of impurities with the coupler uncoupled, coupled and in the steps of coupling/uncoupling, as will more apparent below.

Figure 13:
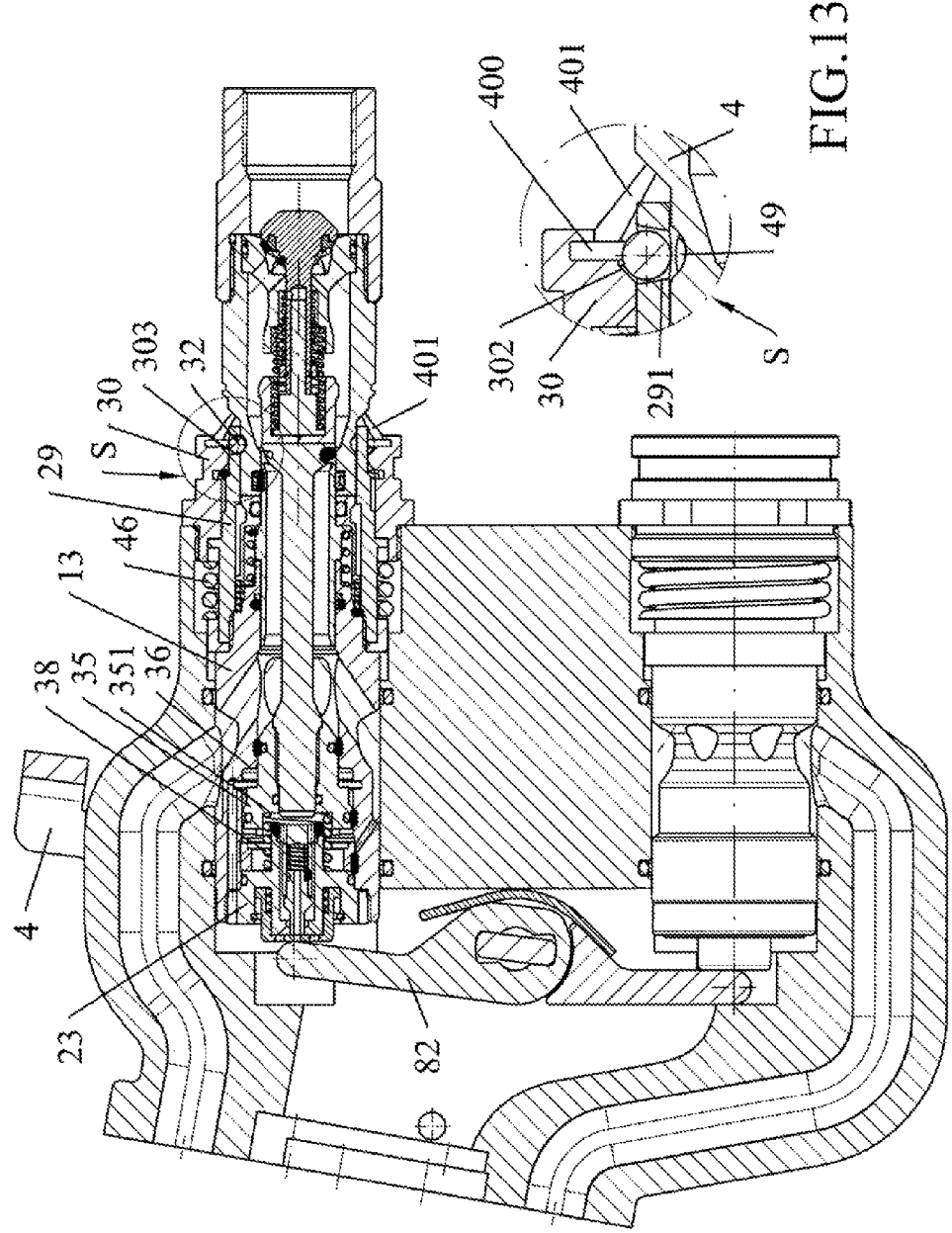
FIG. 13 shows a section view similar to the one in FIG. 1 of the fitting in a third step of uncoupling between male coupler and female coupler, with displacement of the inner parts until the fixing balls are released, with a detail enlarged in circle S.

In case of coupling with the male coupler 48, the bottom 35 slides within the inner body 13 and is stressed by a spring 38 which reacts against the valve body 23 (FIG. 13).

The bottom 35 has two seals 14 and 17 (FIG. 9) on the side of the hydraulic line 49 and on that of the chamber 54, respectively. The zone comprised between the two seals 14, 17 is in contact with the draining line 50 by means of the pipe 56.

The male coupler 48 is shown, in turn, in FIG. 1 and comprises a male body 448 onto the rear of which a fitting 140 with an inner pipe 61 is associated for connecting to a user (not shown), e.g. hydraulic equipment. Such a male coupler 48 may include one or more valves therein. The present description refers to a male coupler with two inner valves.

A first valve 101 (FIG. 1) is present at the interface with the female coupler 47 and comprises a front closing piston 8 provided with a guide rod 2 for a spring 3. The sealing between the male body 448 and the piston 8 is guaranteed by a seal 51 housed in an annular seal of the body near a front end of the male body 448. By engaging with the seal 51, the piston 8 frontally seals a cavity 63 when the male coupler 48 is uncoupled from the female coupler 47.

A second valve 102 is present in the central part of the male coupler 48 and comprises a valve body 11 crossed by a plurality of holes 62. The valves 101 and 102, together with the male body 448, define a cavity 63 with no residual pressure. The sealing of the valve 102 is ensured by the seals 90 and by the seal 120 placed on the shutter 18 which runs inside the valve body 11.

Residual pressure may be present in one or more of the hydraulic lines 49 in operation. By moving the lever 4 (FIG. 2) rightwards, the upper cam 82 is actuated which puts the hydraulic line 49 into connection with the draining line 50 by touching the shutter 25 by means of the cup 72 and allows to relieve the internal residual pressure (FIG. 2).

During such a function, the seal 19 is radially deformed at the deformable portion 193 allowing the passage of fluid through the pipe 191.

During this step, the lower cam 83 does not move because the shaft 5 by rotating rightwards meets a side of the loop 822 of the upper cam 82 feeding it, while the loop 832 of the attachment portion 831 is sufficiently wide to make the shaft 5 rotate without touching any of its sides (FIGS. 18-19).

The force applied by the lever 4 must be such to overcome the resistance of the spring 71, which in all cases holds the lower cam 83 in position.

Having relieved the residual pressure inside the line 49, the system is ready for coupling.

Figure 4:
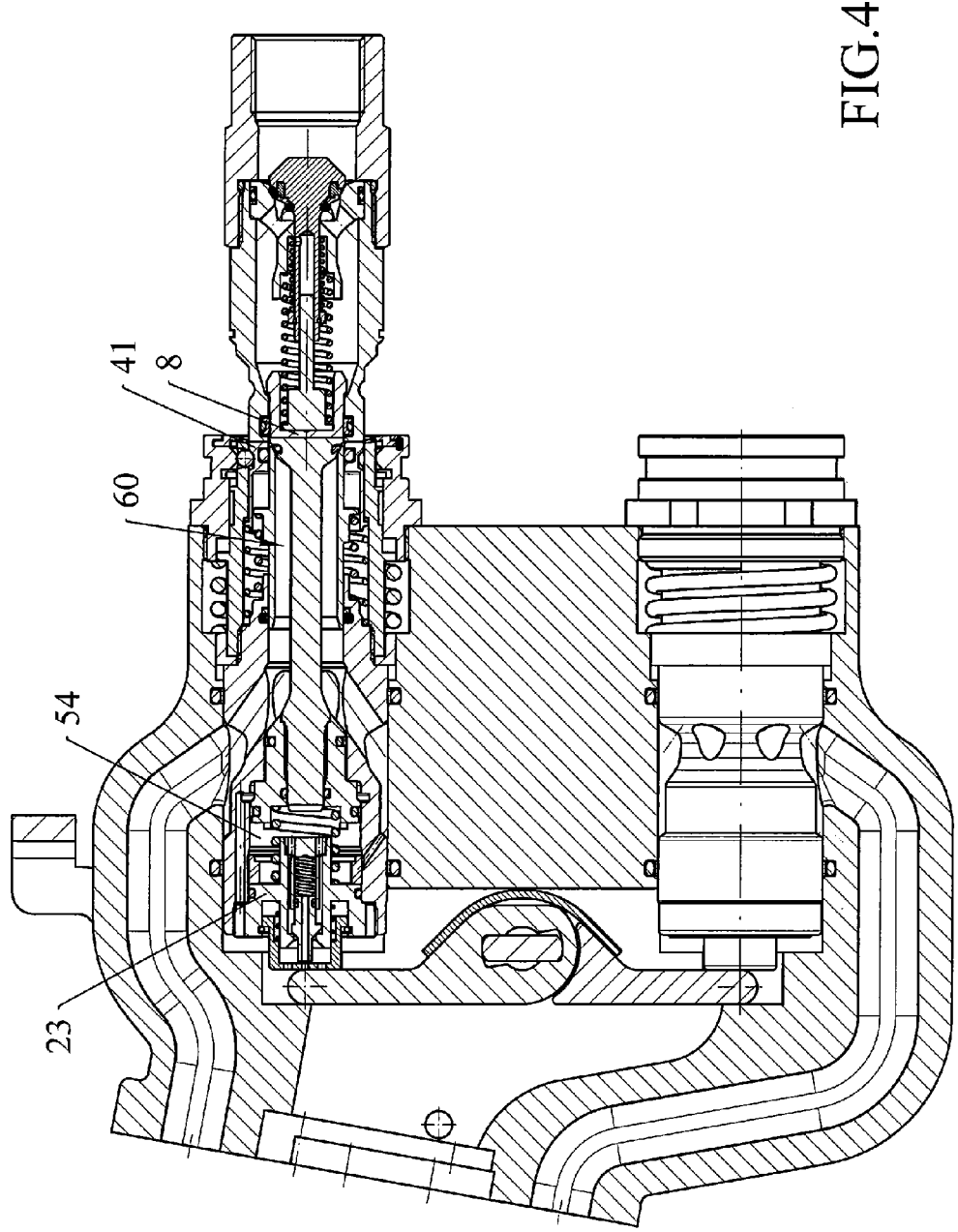
FIGS. 4 and 5 show section views similar to the one in FIG. 1 of the fitting in a second and third step of coupling between male coupler and female coupler, with displacement of the inner part of the male coupler in the female coupler.

The first coupling step (FIG. 4) consists in pushing the male coupler 48 into the female coupler 47 by applying pressure on the flat face 441 of the stem 44. In absence of residual pressure in the pipe 61, the load of the springs 38 of the female coupler and of the springs 9, 16 of the male coupler is equivalent, so that the sealing bush 43 of the female coupler and the valves 101, 102 of the male coupler open. In case of pressure in the pipe 61, there is no residual pressure in the chamber 63 comprised between the valves 101 and 102 of the male coupler 48, the residual pressure being retained upstream of the valve 102 at the pipe 61. By approaching the male coupler 48 to the female coupler 47, the piston 8 comes into contact with the stem 44, which is integral with the bottom 35, the seal 37, and the sealing bush 43, which form the inner assembly 60.

The seal 37 ensures the sealing between the end part of the stem 44 and the bottom 35.

Figure 5:
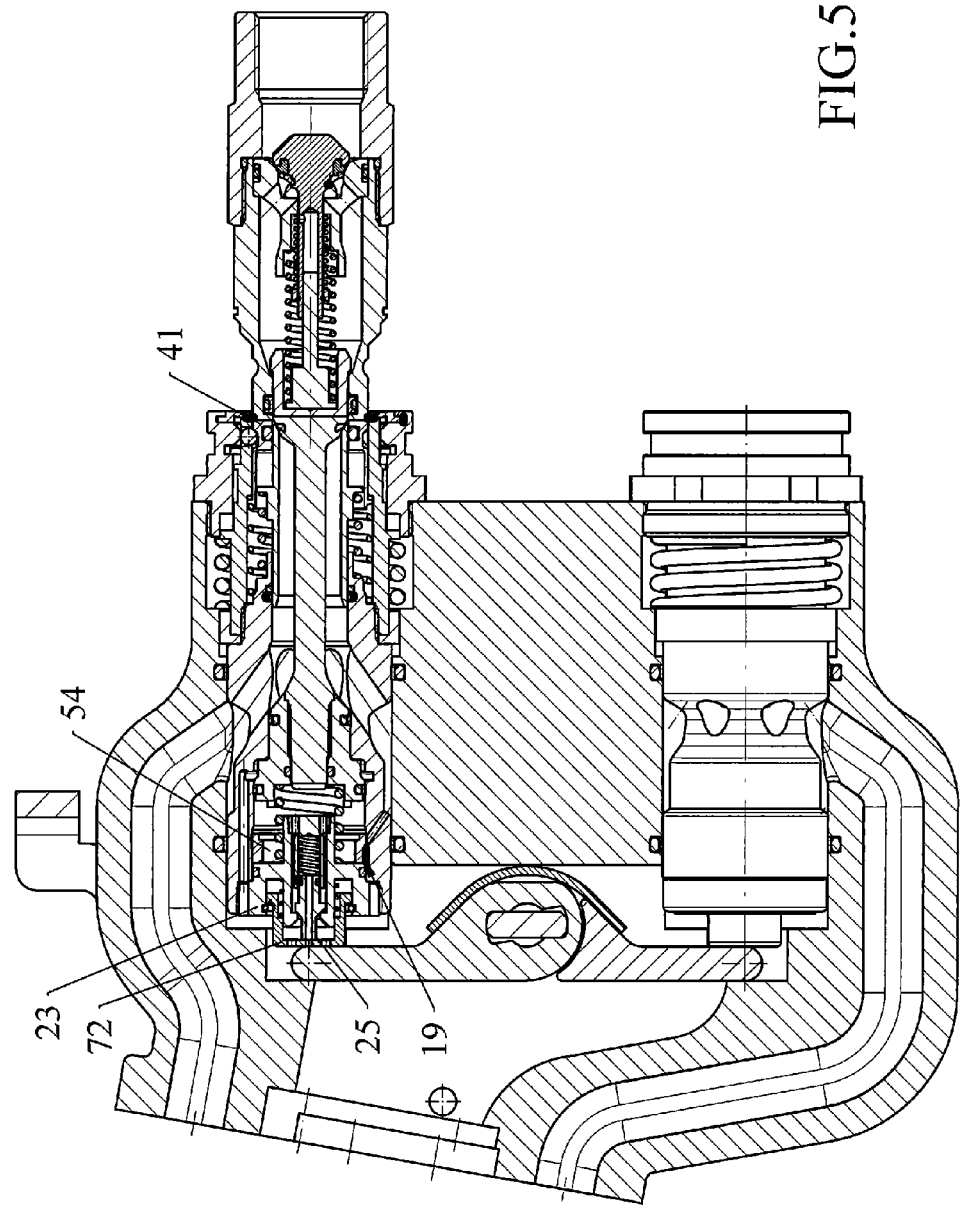

The male body 448 makes the cup 41 (FIG. 4-5) retract by pushing the male coupler 48 into the female coupler 47.

By continuing the thrust of the male coupler towards the female coupler, the cup 41 comes into contact with the balls 32, which, in turn, are in contact with the ring nut holder 19, and thus the entire outer assembly 53 is displaced towards the inside of the female coupler 47 (FIG. 6).

At this point, with the upper cam 82 abutting onto the block 1 and continuing the retraction of the valve body 23, the shutter 25 encounters the cup 72 and relieves the pressure generated in the chamber 54 (FIG. 6).

Figure 8:
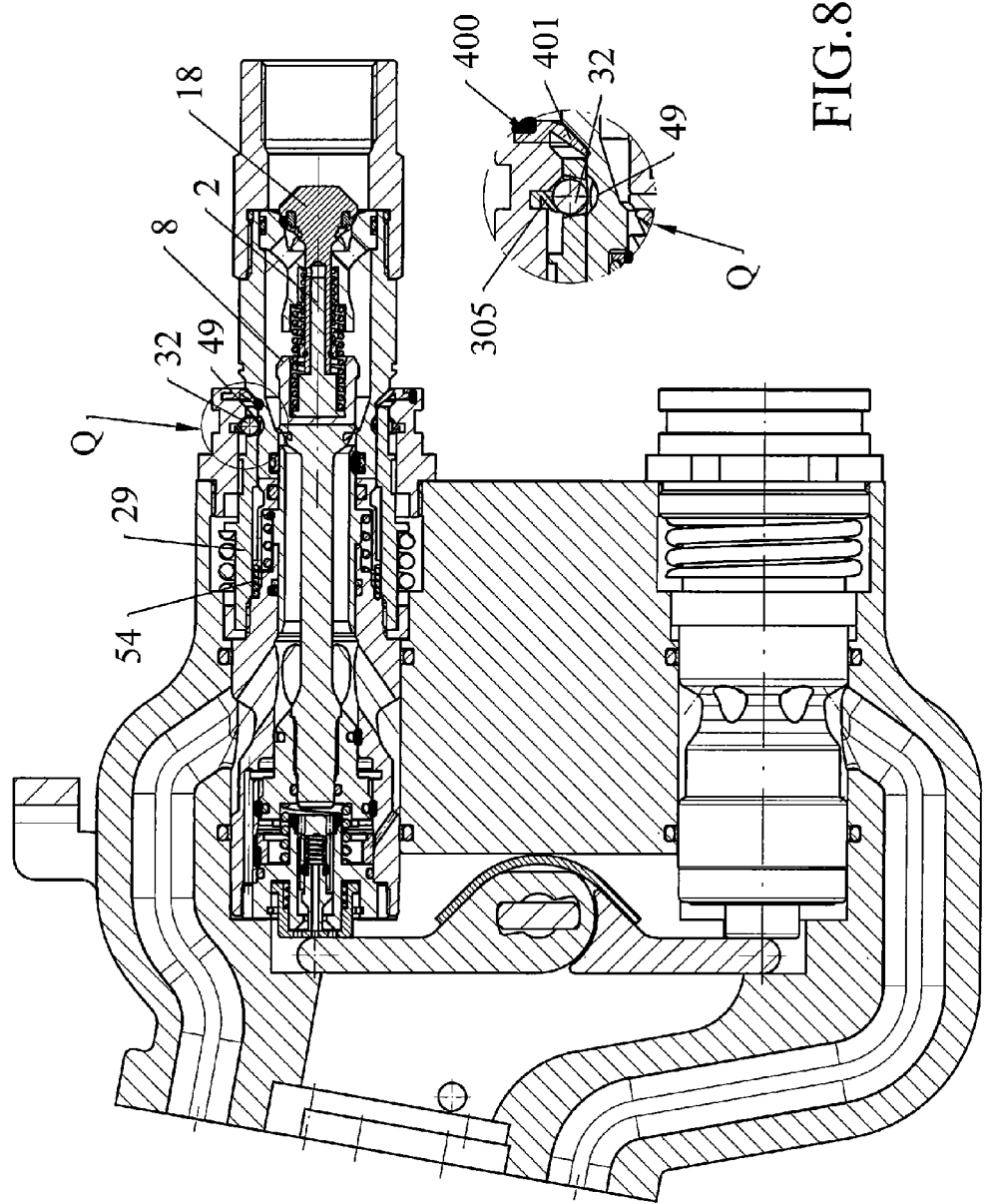
FIG. 8 shows a similar view to the one in FIG. 1 of the fitting in a sixth step of coupling between male coupler and female coupler, with positioning of the male coupler at the fixing balls, with an enlarged detail in circle Q.

By relieving the pressure in the chamber 54, the entire inner assembly 60 can retract because it is pushed by the piston 8, which is in contact with the rod 2 and locked on the valve 18, which cannot open due to presence of rear pressure (FIG. 8).

During the insertion of the male coupler 48 in the female coupler 47 (FIGS. 7-8), the locking balls 32 exit from the seat 412 of the cup 41 and are in contact with a deformable element 305.

The deformable member 305 is deformed by turning clockwise pushed radially by the ball 32 exiting from the seat 412. When the male body 448 is in position such to face the housing 49 of the ball 32, the deformable member 305 pushes the ball 32 within the housing 49 (FIGS. 8-9).

Figure 9:
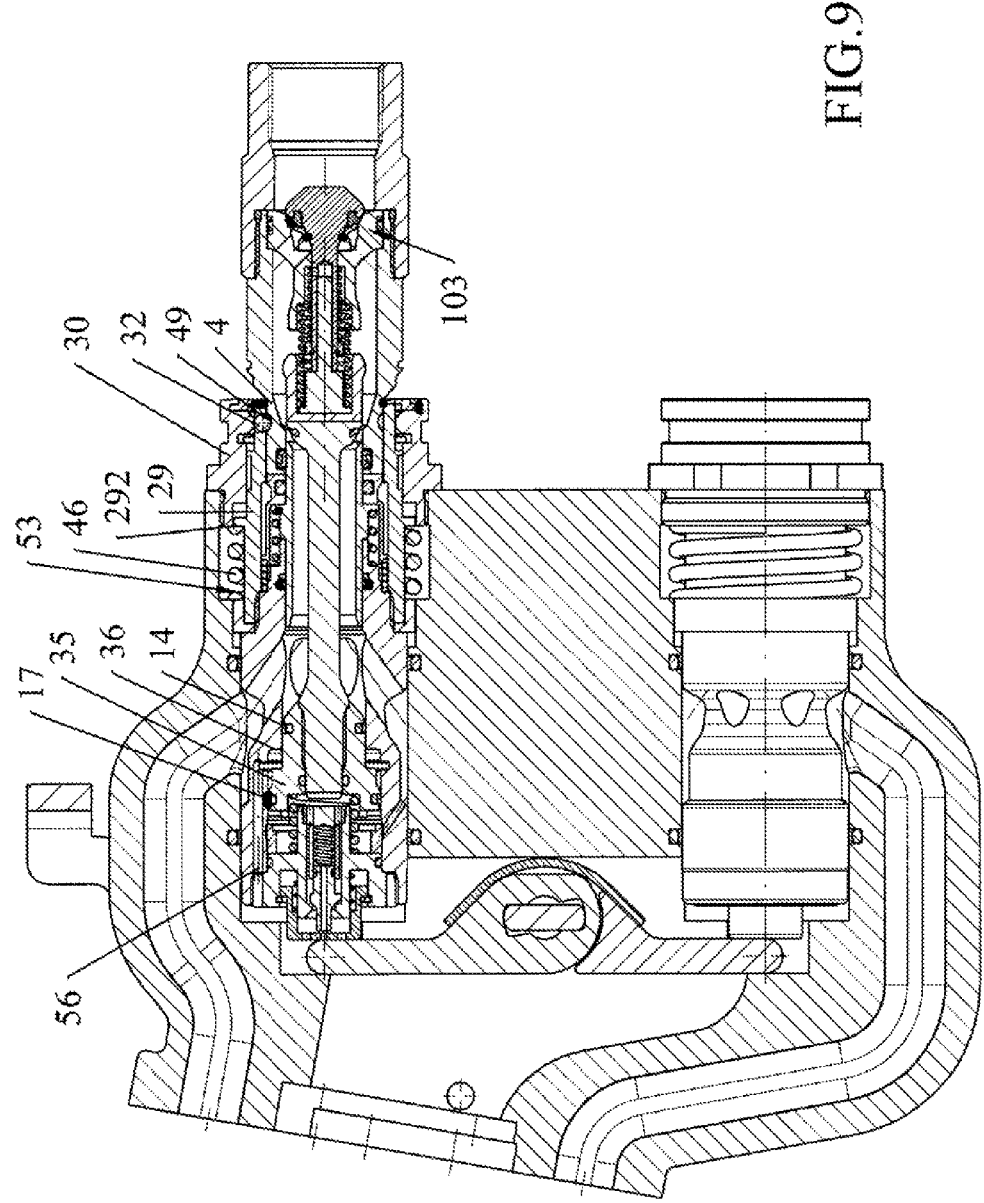
FIG. 9 shows a similar view to the one in FIG. 1 of the fitting in a seventh step of coupling between male coupler and female coupler, with displacement of the outer assembly with locking balls to the locking position of the male coupler.
Figure 10:
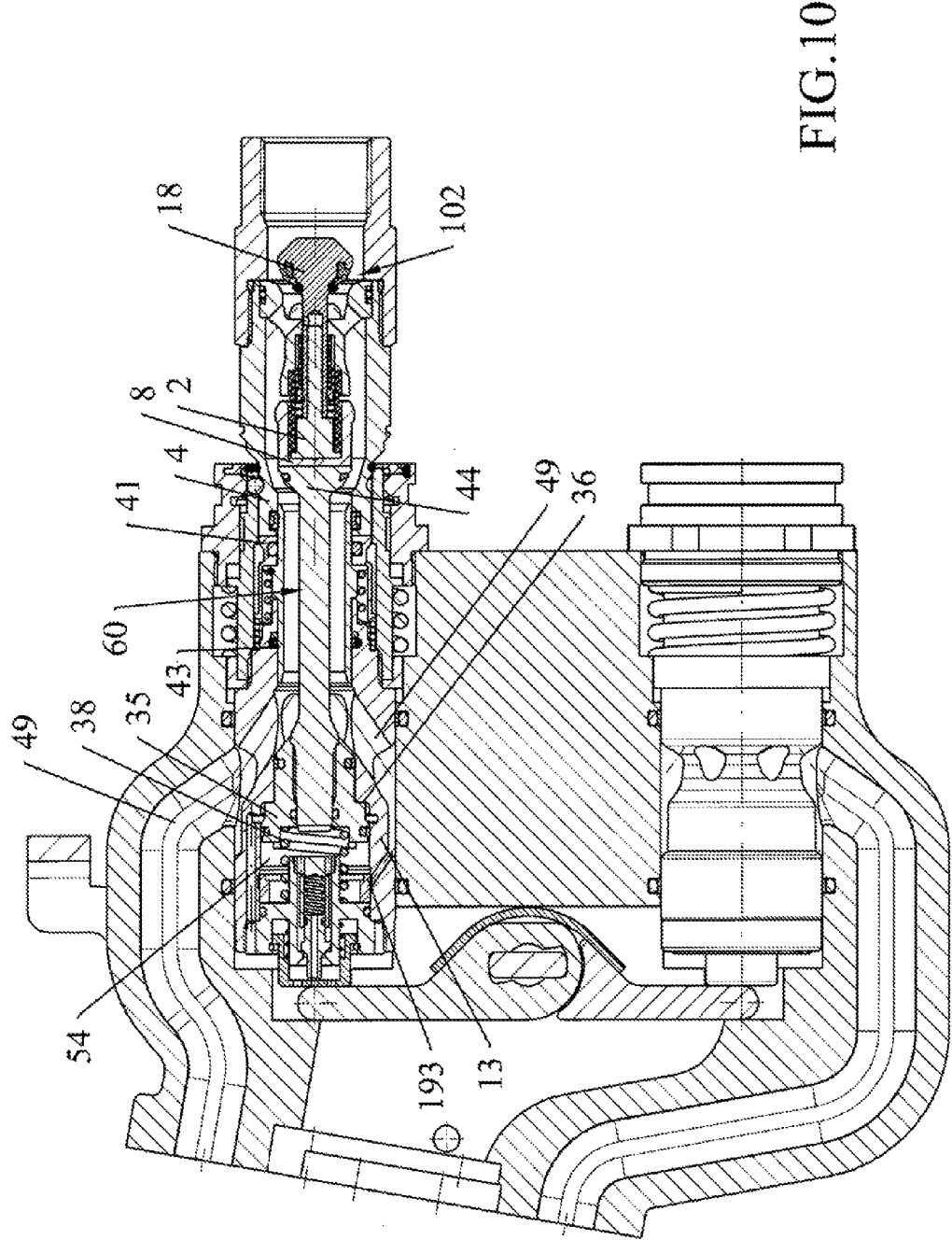
FIG. 10 shows a section view similar to the one in FIG. 1 of the fitting in a eighth step of coupling between male coupler and female coupler, with opening of the male valve by effect of the hydraulic thrust caused by the feeding of the circuit.

In this position, the spring 46 returns the assembly consisting of the outer assembly 53 and the male coupler 48 to the coupled balanced position by working on the shoulder 292 of the lock ring holder 29 (FIG. 9). In case of absence of pressure in the pipe 61, as mentioned above, the inner assembly 60 is not moved and held in position by the spring 38, thus the sealing bush 43 and the shutter 18 are retracted and in this case the circuit is open and the coupler is coupled as shown in FIG. 10.

Before the coupling, the frontal annular seal 400 preloads between ring nut 30, ring nut holder 29 and cup 41 (FIGS. 1 and 2) thus closing any gap which could permit the introduction of impurities into the female coupler 47 also when it is uncoupled from the male coupler 48 together with the flat face 441 of the stem 44.

During the coupling, the deformable portion 401 of the annular seal 400 preloads the outer diameter of the male body 448, thus cleaning any impurities present on such a diameter and preventing carrying them into the female coupler (circle N in FIG. 6). After coupling, the annular seal 400 preloads the ring nut 30, ring nut holder 29 and outer diameter of the male body 448 (FIG. 9), thus preventing the introduction of impurities between these components.

During coupling, the deformable coupling 401 rotates clockwise (i.e. is pushed towards the inside of the female coupler 47), during uncoupling the deformable portion 401 rotates counterclockwise (is pushed outwards by sliding on the male coupling 48).

The manual mechanical coupling operation is complete at this point (FIG. 9); the male coupler 48 is mechanically coupled to the female coupler 47, but by virtue of the fact that the inner assembly 60 was moved towards the inside of the female coupler 47, the valve 102 which retains the residual pressure in the pipe 61 of the male coupler 48 is still not open. Thus, the effort required for the coupling operation is independent from the residual pressure present inside the male coupler 48 because it does not work on the valves which retain the residual pressure.

The valve 102 (FIG. 10) is opened by displacing the inner assembly 60 of the female coupler 47 towards the inside of the male coupler 48 with hydraulic actuation by sending a pressure impulse of the hydraulic line 49.

The hydraulic actuation is achieved by virtue of the deformable portion 193 of the seal 19, which could permit the introduction of fluid from the hydraulic line 49 into the chamber 54 and the consequent thrust on the sealing surface of the bottom 35 which moves the inner assembly 60 towards the male coupler 48. The sealing bush 43 is held in contact with the cup 41, which, in turn, is blocked by the male body 448, and thus the sealing bush 43 opens by overcoming the force of the spring 33.

By continuing its movement towards the male coupler 48, the inner assembly 60 pushes the piston 8 and the rod 2 which comes into contact with the shutter 18, which opens the valve 102, thus releasing the residual pressure and fully opening the passage for the flow of fluid.

The male coupler could also have another valve inside the valve 102 with the purpose of reducing the hydraulic thrust section.

The inner assembly 60 stops when the bottom 35 abuts on the shoulder 36 of the inner body 13 (FIG. 10). In this position, the chamber 54 remains full of oil and pressurized, and no longer allows the movement of the inner assembly 60 except for a movement of the shutter 25 because the seal 19 does not allow the return of fluid towards the hydraulic line 49.

Figure 11:
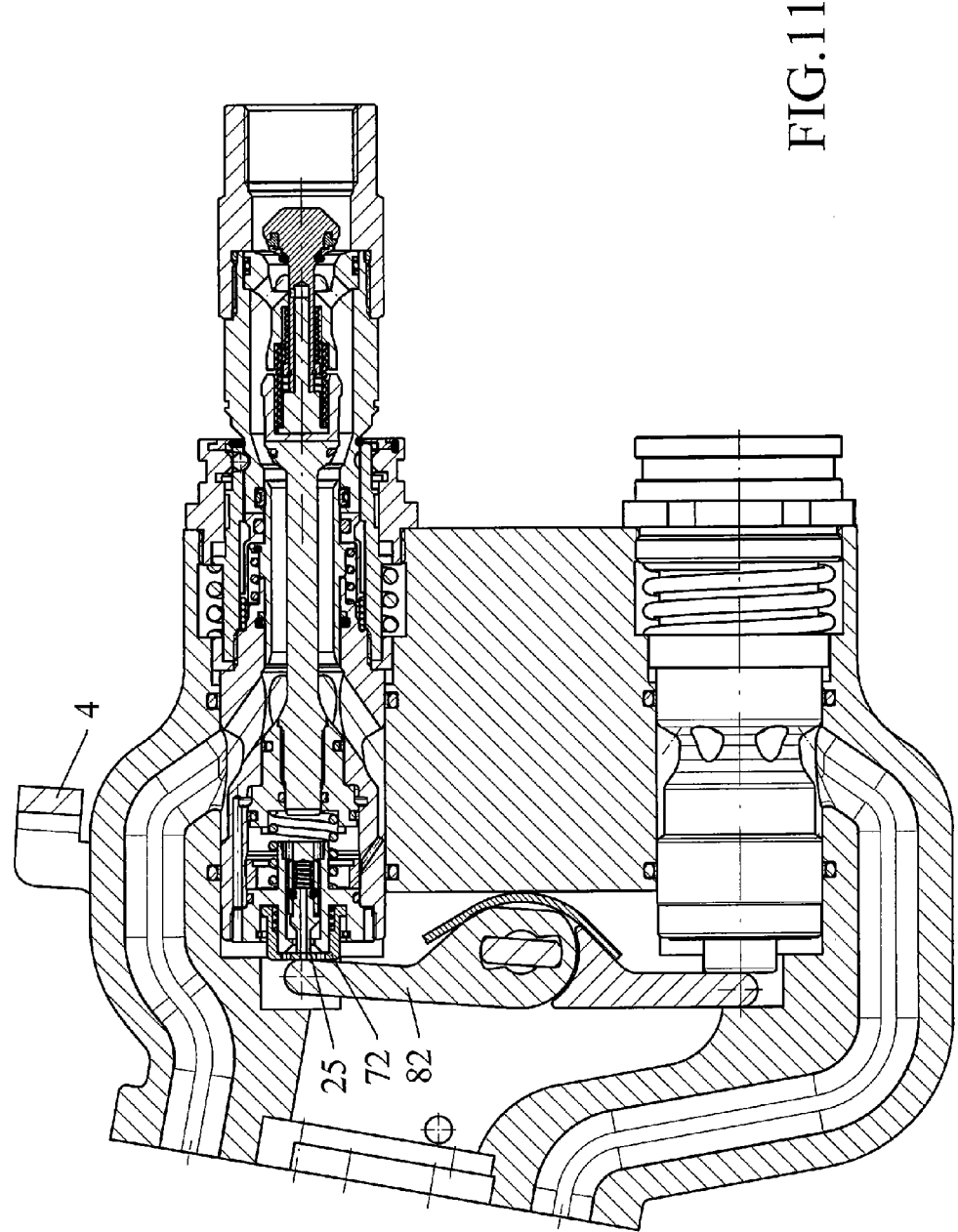
FIG. 11 shows a section view similar to the one in FIG. 1 of the fitting in a first step of uncoupling between male coupler and female coupler, with pressure relief.
Figure 12:
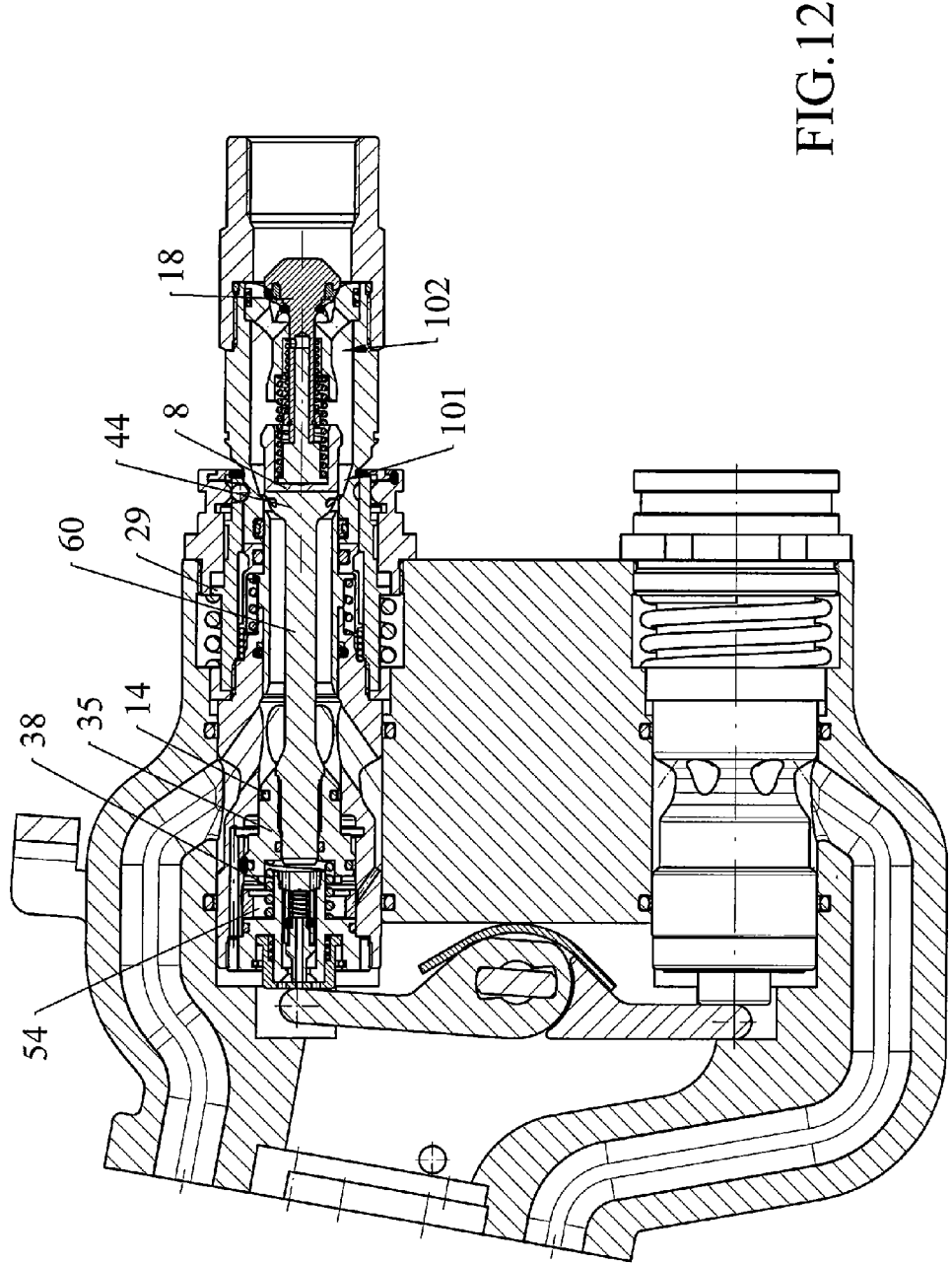
FIG. 12 shows a section view similar to the one in FIG. 1 of the fitting in a second step of uncoupling between male coupler and female coupler, with closing of the male valve.

The uncoupling between male coupler 48 and female coupler 47 starts by acting on the lever 4 (FIG. 11) which moves the upper cam 82, according to the same methods as the initial relieving described above shown in FIGS. 2, 18 and 19, which acts on the shutter 25 by means of the cup 72 putting the hydraulic line 49 into communication with the draining line 50, thus discharging the pressure inside them. In case of pressure and possible flow in the hydraulic line 49 (e.g. caused by a load applied upstream of the male coupler), by actuating the shutter 25 there is a drop of pressure in the chamber 54, while the presence of the seal 19 and of the calibrated pipe 191 causes a higher pressure in the hydraulic line 49, which acts on the seal 14 causing a thrust on the inner assembly 60, which overcomes the spring 38 and thus moves the inner assembly 60 itself, the piston 8 and the shutter 18 which close (FIG. 12).

Figure 14:
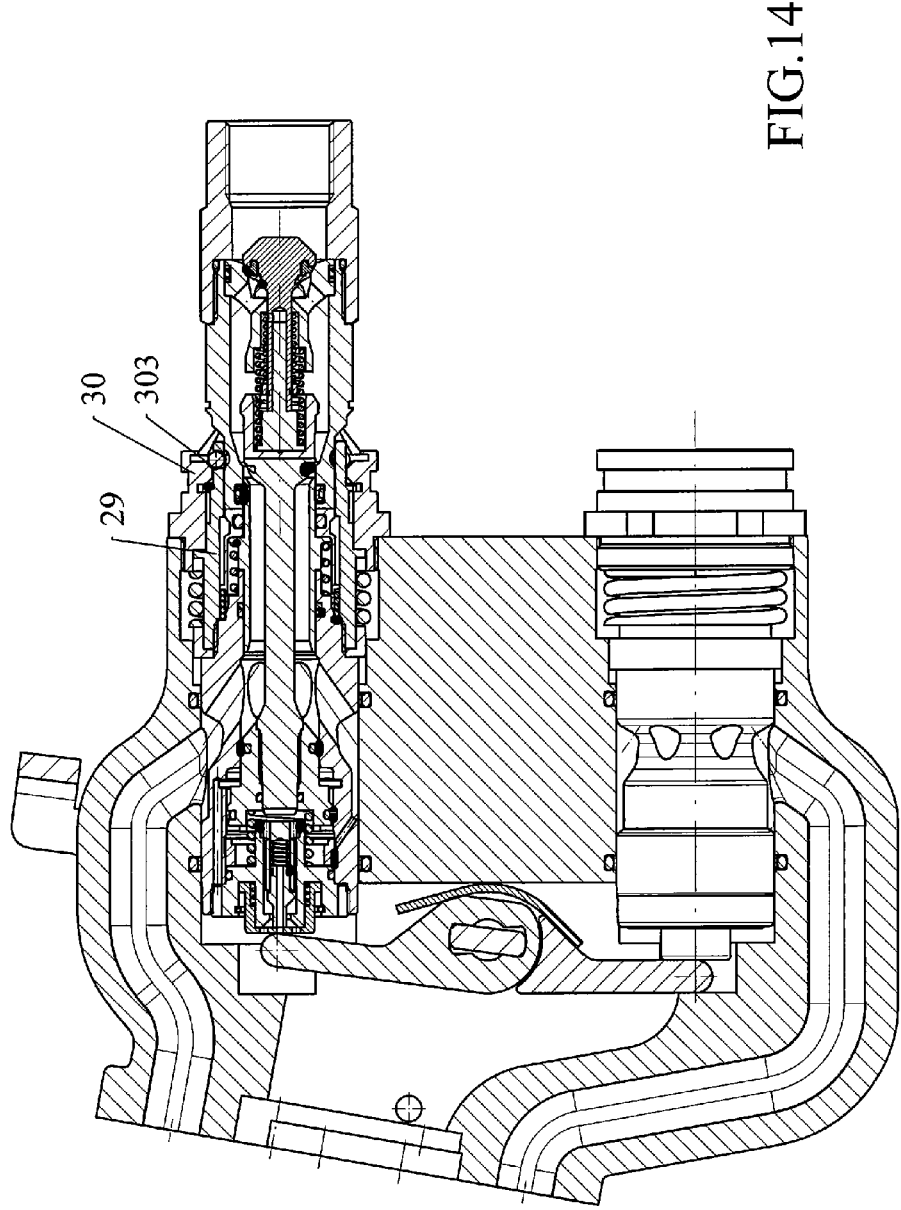
FIG. 14 shows a section view similar to the one in FIG. 1 of the fitting in a fourth step of uncoupling between male coupler and female coupler, with radial displacement of the fixing balls.

Continuing the movement, the upper cam 82 pushes the cup 72 to act on the valve body 23, which in turn moves the whole formed by female coupler 47 and male coupler 48 outwards the locking balls 32 with the recess 303 on the fixing ring nut 30. In such a position, the locking balls 32 exit from the recess 49 in the male body 448 and release it letting it out (FIGS. 13-14).

It is worth noting that the loop 832 of the lower cam 83 is sufficiently wide to allow a double movement of the upper cam 82 at the end of the second movement, the shaft 5 nearly abutting onto a side of said loop 832 (FIGS. 20-21).

Figure 15:
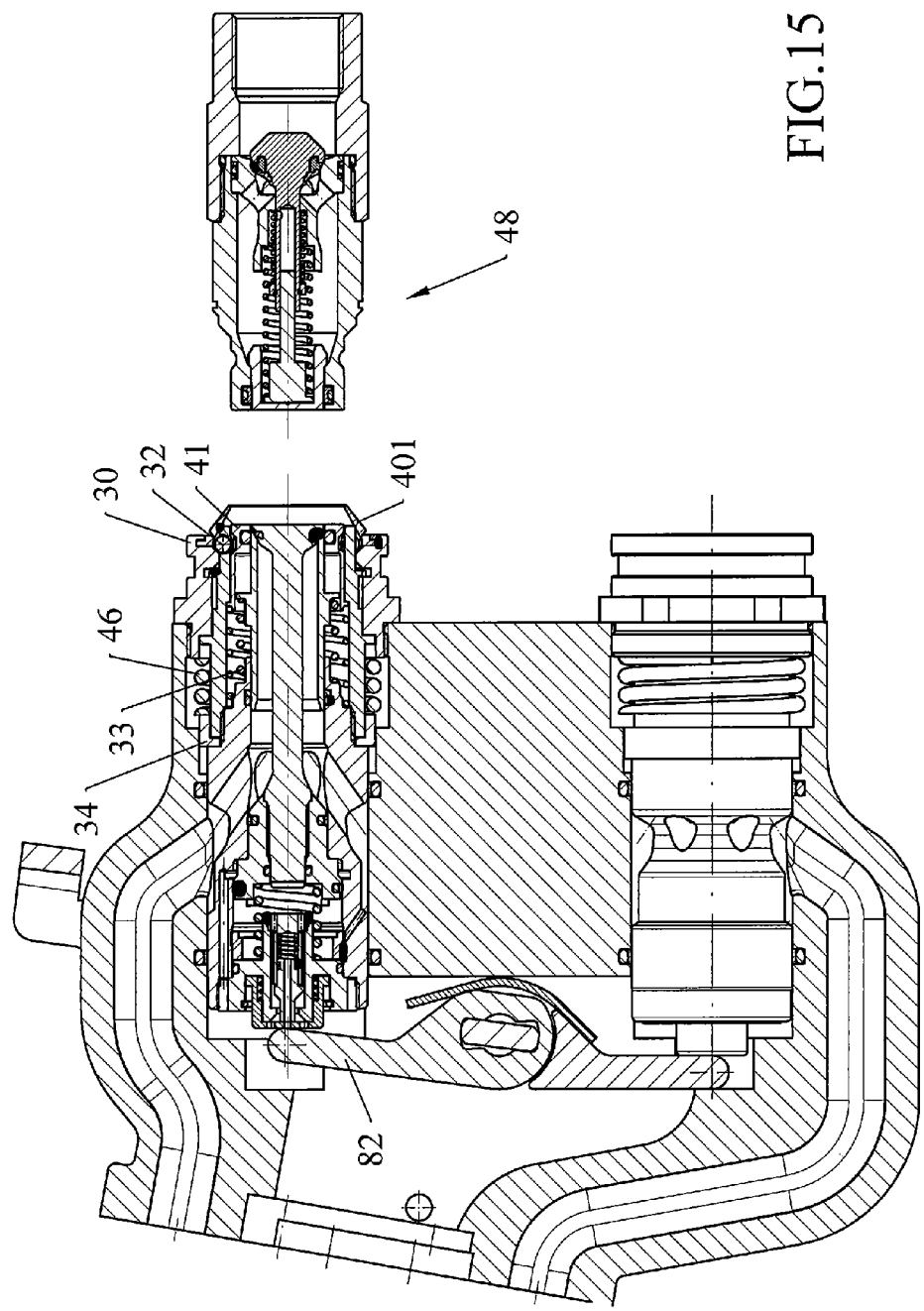
FIG. 15 shows a section view similar to the one in FIG. 1 of the fitting, with male coupler and female coupler uncoupled.

The unrestrained male coupler 48 is uncoupled by effect of the thrust of the inner springs. Having released the balls 32, the spring 46 returns the female coupler 47 to the resting position by working on the ring 34 (FIGS. 15 and 1).

It is worth noting that during the steps of uncoupling, the deformable portion 401 of the seal 400 rotates outwards stressed and distanced by the male coupler. The final return of the outer assembly 53 returns the seal 400 to the initial position in FIG. 1 for elastic return.

After having released the lever 4, the system is ready for a new connection.

The female coupler 47 coupled by means of the locking balls 32 is fed outwards when coupled, if the male coupler 48 is pulled. When the locking balls 32 reach the recess 303 of the ring nut 30, the male coupler 48 is uncoupled (accidental uncoupling, "breakaway" function).

Figure 27:
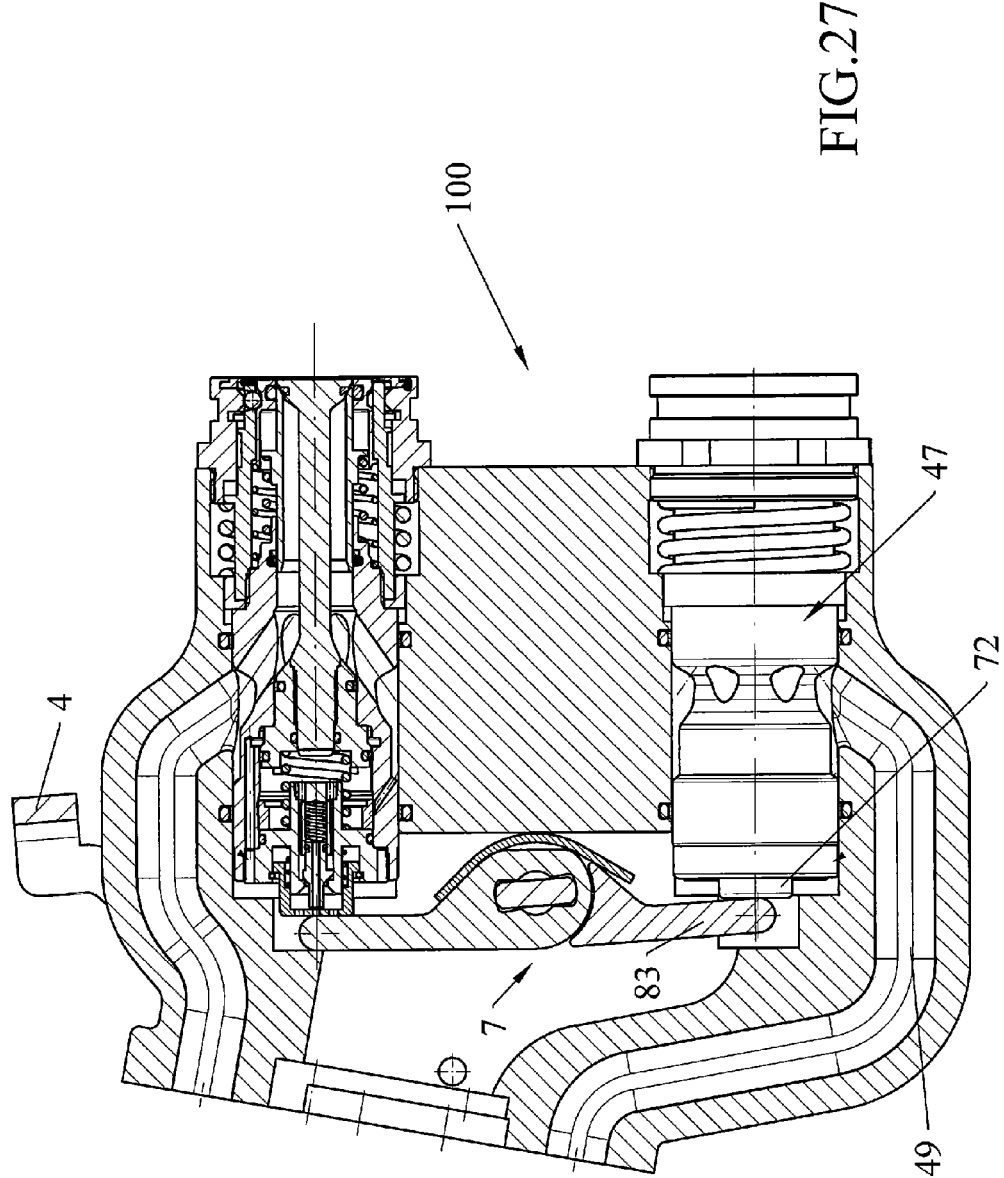
FIG. 27 shows a section view similar to the one in FIG. 1 of the fitting in a step of relieving of the residual pressure before the coupling between male coupler and female coupler of the lower hydraulic line.

The engagement of the lower line is similar to that of the upper line it being worth noting that the lever 4 moves leftwards in opposite direction (FIG. 27): the interaction between the shaft 5 and the attachment portion 831 of the lower cam 83 is similar to that described above for the attachment portion 821 of the upper cam 82, in which the loop 822 allows the rotation of the attachment portion 831 of the lower cam 83 without moving the upper cam 82.

Figure 24:
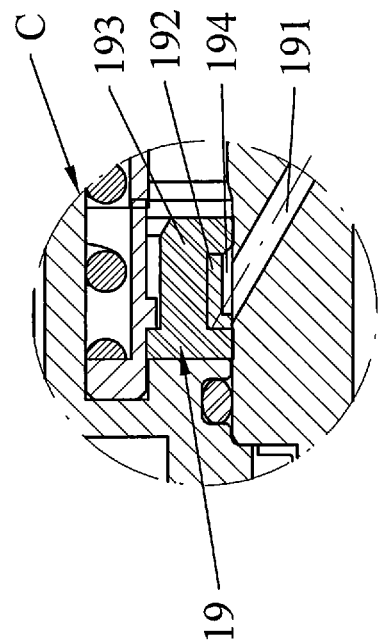
FIG. 24 shows a section view similar to the one in FIG. 1, of a female coupler with a radial seal, shown enlarged in circle B in accordance with a further embodiment.
Figure 25:
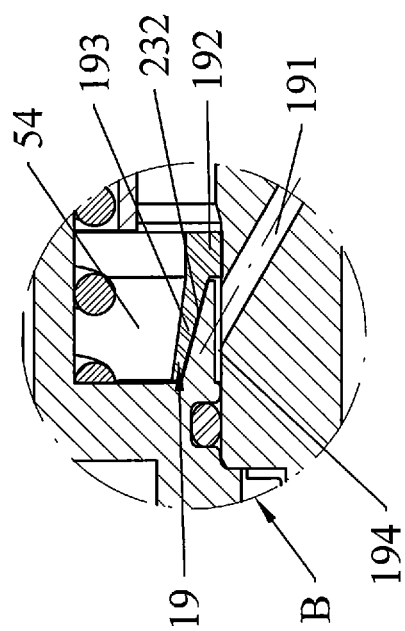
FIG. 25 shows a section view similar to the one in FIG. 1, of a female coupler with a radial seal, shown enlarged in circle C in accordance with a yet further embodiment.
Figure 26:
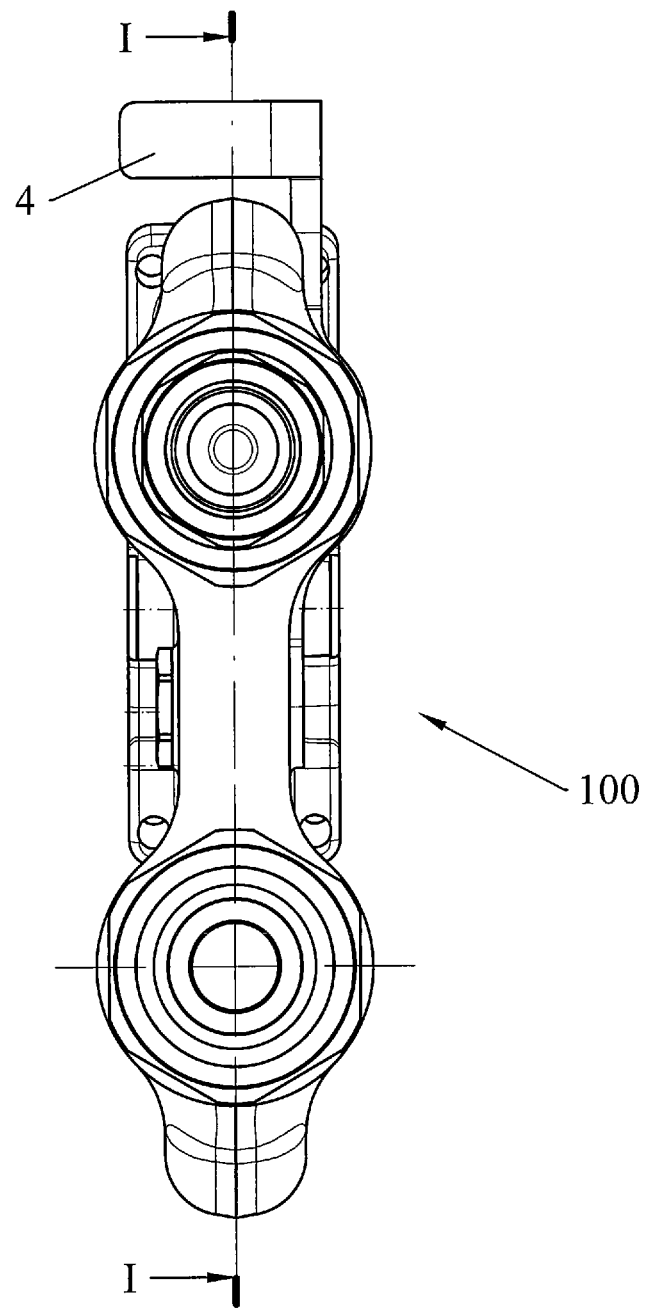
FIG. 26 shows a front view of the fitting according to the present invention.

FIGS. 24-25 show female couplers 47 with seals 19 according to two further embodiments.

The seal 19 in FIG. 24 is not placed directly on the mouth of the pipe 191, there being provided an annular gap 194 obtained on the valve body 23 which allows to limit the wear of the seal 19 itself, which again includes a non-deformable portion 192 and a deformable portion 193.

Said gap 194 allows to direct the pressurized flow exiting from the mouth of the pipe 191 firstly towards the non-deformable portion 192, then onto the deformable portion 193, on both sides of said mouth of the pipe 191.

Said deformable portion 193 has a reduced thickness with respect to the non-deformable portion 192, which is further reduced by moving away from the non-deformable portion 192. When there is pressure in the chamber 54, the deformable portion 193 presses on a conical surface 232 of the valve body 23. When there is no pressure in the chamber 54, the pressurized fluid in the hydraulic line 49 bends the deformable portion 193 inwards starting from the most distant part from the non-deformable portion 192.

The seal 19 in FIG. 25 instead includes the non-deformable portion 192 made of more rigid material directly on the mouth of the pipe 191.

Said non-deformable portion 192 has an L-shaped section and is adapted to direct the pressurized fluid coming from the pipe 191 towards the deformable portion 193 which does not face the mouth of the pipe 191 directly. As apparent in the enlargement shown in circle C, the L is rotated by 90° clockwise to form an annular gap 194 also in this case: the short part of the L closes an end of the mouth of the pipe 191, while the longer part of the L of the pipe 191, directs the pressurized fluid towards the deformable portion 193 of the seal 19.

Consequently, the wear of the seal 19 is limited also in this second embodiment which indeed derives from the direct interaction between the mouth of the pipe 191 and the deformable portion 193 of the seal 192, which is excluded in this manner.

Figures 30, 31:
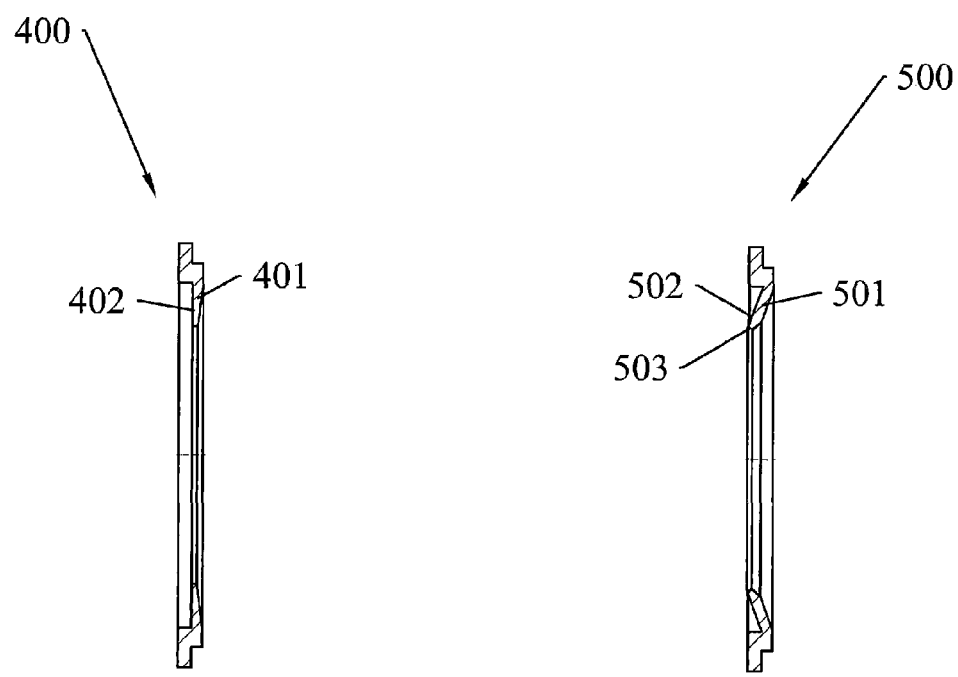
FIG. 30 shows a section view of the frontal seal in accordance with a first embodiment comprised in the fitting in FIG. 1.
FIG. 31 shows a section view of the frontal seal in accordance with a second embodiment comprised in the fitting in FIG. 28.

FIGS. 28-31 show a frontal annular seal 500 in accordance with a second embodiment comprising again a deformable position 501, which respect to said first embodiment 400 includes a resting surface 502 for the ring nut holder 29, which ends on the cup 41, also inclined when the seal 500 is disassembled (compare FIGS. 30 and 31).

Figure 28:
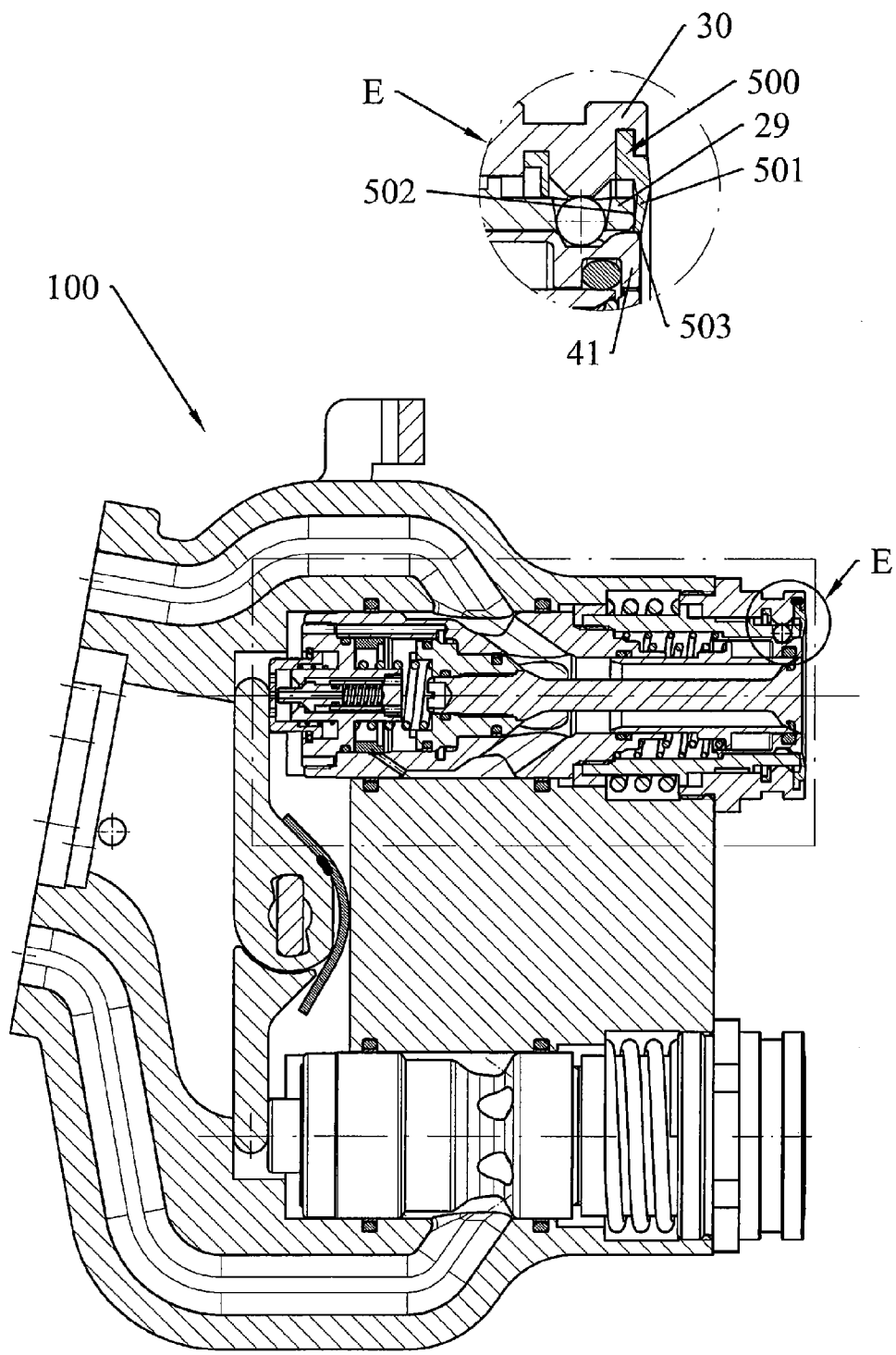
FIG. 28 shows a section view similar to the one in FIG. 1 with a second embodiment of a frontal seal shown partially enlarged in circle E mounted on the uncoupled female coupler.
Figure 29:
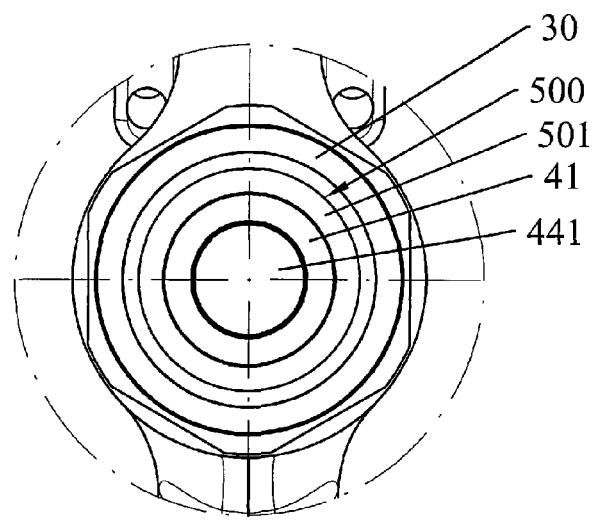
FIG. 29 shows an enlarged view from the right of the uncoupled female coupler in FIG. 28.

As shown in circle E in FIG. 28, the surface 502 frontally preloads on the ring nut holder 29, while on the cup 41 the preload is circumferential, an edge 503 of the seal 500 being concerned.

It is worth noting that the resting surface 402 of the first seal 400 is in line (vertical) with the flat face 441 of the stem 44, while the resting surface 502 of the second seal 500 is inclined with the seal 500 both mounted (FIG. 28) and disassembled from the female coupler 47 (FIG. 31).

This determines a greater preload on the ring nut holder 29 and on the cup 41, thus preventing the even accidental lifting of the deformable portion 501, for example if the operator, before coupling, attempts to remove the residual dirt from the flat face 441 of the rod 44 manually.

The invention claimed is:

1. A fluid transmission coupling assembly comprising a flat-faced female coupler inserted in a hydraulic feeding block belonging to the fluid transmission assembly, and a male coupler adapted to be coupled with the female coupler,
the block including at least one hydraulic line and a draining line, and a lever integral with a cam adapted to relieve the pressure from a chamber inside the female coupler and adapted to uncouple the male coupler from the female coupler,
the female coupler comprising a pressure relief valve which puts the chamber into communication with the draining line,
the female coupler further comprises an inner assembly axially sliding within an outer assembly of the female coupler itself,
the inner assembly comprising a bottom and a stem with a flat face facing towards the outside of the female coupler, integral with each other, and a sealing bush which defines a gap,
the outer assembly comprising a ring nut holder, a ring nut, and at least one locking ball arranged inside a housing of the ring nut holder,
the ring nut holder axially sliding with respect to the ring nut, and a cup axially sliding in the ring nut holder,
the female coupler further comprising a frontal annular seal supported by the ring nut facing the male coupler with a deformable portion preloading the ring nut, the ring nut holder, and the cup.

2. The fluid transmission coupling assembly according to claim 1, wherein the deformable portion of the frontal annular seal includes a resting surface for the ring nut holder and a resting edge for the cup, the resting surface being inclined with respect to the flat face of the stem when the seal is mounted on the female coupler uncoupled from the male coupler, the resting surface frontally preloading the ring nut holder.

3. The fluid transmission coupling assembly according to claim 1, wherein the cup includes a further seal which preloads the diameter of the sealing bush.

4. The fluid transmission coupling assembly according to claim 1, wherein a housing of the ring nut comprises a deformable member adapted to push the locking ball radially towards a housing of the male body.

* * * * *